(12) United States Patent
Sherman et al.

(10) Patent No.: US 9,413,807 B1
(45) Date of Patent: Aug. 9, 2016

(54) BROWSER RENDERING AND COMPUTATION

(71) Applicant: Tableau Software Inc., Seattle, WA (US)

(72) Inventors: Scott Sherman, Seattle, WA (US); James Baker, Seattle, WA (US); Lu Sien Tan, Seattle, WA (US); Justin Frederick Rockwood, Kirkland, WA (US); Jason Scott King, Issaquah, WA (US); Daniel Philip Cory, Seattle, WA (US); Stephen Howard Pellegrin, Seattle, WA (US); Austin David Dahl, Seattle, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 296 days.

(21) Appl. No.: 14/054,780

(22) Filed: Oct. 15, 2013

Related U.S. Application Data

(60) Provisional application No. 61/795,406, filed on Oct. 15, 2012.

(51) Int. Cl.
*H04L 29/08* (2006.01)

(52) U.S. Cl.
CPC ....................................... *H04L 67/02* (2013.01)

(58) Field of Classification Search
CPC .... H04L 67/02; H04L 67/36; G06F 17/30905
See application file for complete search history.

(56) References Cited

U.S. PATENT DOCUMENTS

| | | | | |
|---|---|---|---|---|
| 2002/0129096 | A1* | 9/2002 | Mansour ............... | G06F 9/4443 709/203 |
| 2008/0134064 | A1* | 6/2008 | Bates .................... | G06F 3/0485 715/762 |
| 2010/0211865 | A1* | 8/2010 | Fanning ............ | G06F 17/30905 715/234 |
| 2012/0215834 | A1* | 8/2012 | Chen ................. | G06F 17/30905 709/203 |
| 2013/0007107 | A1* | 1/2013 | Behl ........................ | H04L 29/00 709/203 |
| 2013/0147819 | A1* | 6/2013 | Dharmapurikar ...... | H04N 19/27 345/522 |
| 2013/0283054 | A1* | 10/2013 | Adams .................... | H04L 51/08 713/176 |
| 2014/0035900 | A1* | 2/2014 | Slavin, III ............... | G06T 15/20 345/419 |

* cited by examiner

*Primary Examiner* — Uzma Alam
(74) *Attorney, Agent, or Firm* — Morgan, Lewis & Bockius LLP

(57) ABSTRACT

A method dynamically assigns tasks for visually presenting data. A server receives a request, from a client device, to display a visual representation of data in a designated format. The request specifies one or more client device characteristics, including: client memory capacity; current client memory utilization; client processor capability; current client processor utilization; and the client's web browser. The server determines whether to render the requested visual representation at the server or at the client device based on several factors, including the client device characteristics and the size of the data set. When rendering at the client, the server sends the requested data to the client, including data necessary to render the visual representation in the designated format. Otherwise, the server renders the requested visual representation according to the designated format using the data, and sends the rendered image to the client.

13 Claims, 7 Drawing Sheets

BROWSER RENDERING AND COMPUTATION

PRIORITY

This application claims priority to U.S. Provisional Application Ser. No. 61/795,406, filed Oct. 15, 2012, entitled "Browser Rendering and Computation," which is incorporated by reference herein in its entirety.

TECHNICAL FIELD

The disclosed implementations relate generally to displaying graphical visualizations of data and more specifically to dynamically allocating the workload for data visualization between a server and a client device.

BACKGROUND

When dealing with large and complex datasets, visualization is an important tool. Systems that display complex data sets visually enable that data to be presented to a user in an easy to understand format. Preparing data to be displayed visually includes gathering the appropriate data set, filtering it, and making necessary calculations to generate the data necessary for a rendering engine to render the information. The visual data is then rendered. Preparing visual representations of data can be time consuming and processor intensive. The time and processing power needed to render images increases as the size and complexity of data sets increases. Because modern computers gather and store more data and more complex data, the ability to efficiently produce visual representations of the data is increasingly important.

Additionally, more and more data is accessed over networks such as the Internet. The data stored at a server system will be displayed on client systems. For example, when a client requests a particular visualization of data from a server system, the web server either renders the data into the requested visualization and sends the rendered images to the client to be displayed, or sends the data to the client to be rendered and displayed by the client device.

SUMMARY

In accordance with some implementations, a method for dynamically assigning tasks for visually presenting interactive data is disclosed. The method is performed at a server having one or more processors and memory storing one or more programs for execution by the one or more processors. The server receives a request, from a client device, to display a visual representation of a designated data set in a designated format. The request further specifies one or more client device characteristics. The one or more device characteristics may include: memory capacity of the client device; current memory utilization of the client device; processor capability of the client device; current utilization of the processors of the client device; and/or identification of a web browser at the client device that issued the request. The server determines whether to render the requested visual representation at the server or at the client device based on a plurality of factors, including the one or more specified client device characteristics and a size of the designated data set. When it is determined to render the requested visual representation at the client device, the server sends the requested set of data to the client device, including data necessary to render the requested visual representation of the designated data set in the designated format. When it is determined to render the requested visual representation at the server, the server renders the requested visual representation to produce a rendered image, using the designated data set and formatting in the designated format, and sends the rendered image to the client device for display.

In accordance with some implementations, a method for dynamically assigning tasks for visually presenting interactive data is disclosed. The method is performed by a server system having one or more processors and memory storing one or more programs for execution by the one or more processors. The server system receives a request, from a client system, to display a visual representation of a designated set of data. The server analyzes the request, including information provided in the request specifying the capabilities of the client system. Based on the analysis, the server system determines whether to render the requested visual representation at the server system or at the client system. When the server system determines to render the visual representation at the client system, the server system sends the requested set of data to the client system for rendering and display. When the server system determines to render the visual representation at the server system, the server system renders the requested visual representation to produce a rendered image and sends the rendered image to the client system for display at the client system.

In accordance with some implementations, a server system for dynamically assigning tasks for visually presenting interactive data is disclosed. The server system has one or more processors and memory storing one or more programs to be executed by the one or more processors. The one or more programs include instructions for receiving a request, from a client system, to display a visual representation of a designated set of data. The one or more programs further include instructions for analyzing the request, including information in the request specifying the capabilities of the client system. The one or more programs also include instructions for determining whether to render the requested visual representation at the server system or at the client system. The one or more programs further include instructions for sending the requested set of data to the client system for rendering and display when the server system determines to render the requested visual representation at the client system. The one or more programs further include instructions for rendering the requested visual representation to produce a rendered image and sending the rendered image to the client system when the server system determines to render the requested visual representation at the server system.

In accordance with some implementations, a non-transitory computer readable storage medium stores one or more programs configured for execution by a server system. The server system has one or more processors and memory storing one or more programs to be executed by the one or more processors. The one or more programs include instructions for receiving a request, from a client system, to display a visual representation of a designated set of data. The one or more programs further include instructions for analyzing the request, including information in the request specifying the capabilities of the client system. The one or more programs also include instructions for determining whether to render the requested visual representation at the server system or at the client system. The one or more programs further include instructions for sending the requested set of data to the client system for rendering and display when the server system determines to render the requested visual representation at the client system. The one or more programs further include instructions for rendering the requested visual representation to produce a rendered image and sending the rendered image to the client system when the server system determines to render the requested visual representation at the server system.

In accordance with some implementations, a method for presenting a visual representation of a data set is disclosed. The method is performed at a client system having one or more processors and memory storing one or more programs for execution by the one or more processors. The client system stores data to display a visualization of the data set. The client system displays a first visual representation of the data set. The client system then detects a user interaction with the displayed visual representation, which prompts a second visual representation. The client system determines, based on the detected user interaction, whether data stored at the client system includes all data necessary to display the second visual representation. When the data stored at the client system includes all data necessary to display the second visual representation, the client system uses the stored data to display the second visual representation. When the data stored at the client system does not include all data necessary to display the second visual representation, the client system requests the data necessary to display the second visual representation from the server system, receives the requested data from the server system, and uses the requested data to render and display the second visual representation.

In accordance with some implementations, a client system for presenting a visual representation of a data set is disclosed. The client system has one or more processors and memory storing one or more programs to be executed by the one or more processors. The one or more programs include instructions for storing data to display a visualization of the data set. The one or more programs include instructions for displaying a first visual representation of the data set. The one or more programs also include instructions for detecting a user interaction with the displayed visual representation, which triggers a second visual representation. The one or more programs include instructions for determining, based on the detected user interaction, whether data stored at the client system includes all data necessary to display the second visual representation. The one or more programs include instructions that execute when the data stored at the client system includes all data necessary to display the second visual representation, using the stored data to display the second visual representation. The one or more programs also include instructions that execute when the data stored at the client system does not include all data necessary to display the second visual representation, including instructions for requesting the data necessary to display the second visual representation from the server system, instructions for receiving the requested data from the server system, and instructions for using the requested data to render and display the second visual representation.

In accordance with some implementations, a non-transitory computer readable storage medium stores one or more programs configured for execution by a client system. The client system has one or more processors and memory storing one or more programs to be executed by the one or more processors. The one or more programs include instructions for storing data to display a visualization of the data set. The one or more programs include instructions for displaying a first visual representation of the data set. The one or more programs also include instructions for detecting a user interaction with the displayed visual representation, which triggers a second visual representation. The one or more programs include instructions for determining, based on the detected user interaction, whether data stored at the client system includes all data necessary to display the second visual representation. The one or more programs include instructions that execute when the data stored at the client system includes all data necessary to display the second visual representation, using the stored data to display the second visual representation. The one or more programs also include instructions that execute when the data stored at the client system does not include all data necessary to display the second visual representation, including instructions for requesting the data necessary to display the second visual representation from the server system, instructions for receiving the requested data from the server system, and instructions for using the requested data to render and display the second visual representation.

In accordance with some implementations, a method for presenting a visual representation of a designated set of data is disclosed. The method is performed at a client system having one or more processors and memory storing one or more programs for execution by the one or more processors. The client system detects user interaction with the client system. The client system then sends a request to a server system based on the detected user interaction. The client system receives data from the server system in response to the request. The client system determines whether the data received from the server system includes any server-rendered images. In accordance with a determination that the received data does not include any server-rendered images, the client system renders one or more images using the data received from the server system, and displays the client-rendered images.

In accordance with some implementations, a client system for presenting a visual representation of a designated set of data is disclosed. The client system has one or more processors and memory storing one or more programs to be executed by the one or more processors. The one or more programs include instructions for detecting user interaction with the client system. The one or more programs include instructions for sending a request to a server system based on the detected user interaction. The one or more programs further include instructions for receiving data from the server system in response to the request. The one or more programs include instructions for determining whether the data received from the server system includes any server-rendered images. The one or more programs include instructions for determining that the received data does not include any server-rendered images and accordingly rendering one or more images using the data received from the server system, and displaying the client-rendered images.

In accordance with some implementations, a non-transitory computer readable storage medium stores one or more programs configured for execution by a client system. The client system has one or more processors and memory storing one or more programs to be executed by the one or more processors. The one or more programs include instructions for detecting user interaction with the client system. The one or more programs include instructions for sending a request to a server system based on the detected user interaction and instructions for receiving data from the server system in response to the request. The one or more programs include instructions for determining whether the data received from the server system includes any server-rendered images. The one or more programs include instructions for determining that the received data does not include any server-rendered images and accordingly rendering one or more images using the data received from the server system, and displaying the client-rendered images.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Figure 1:
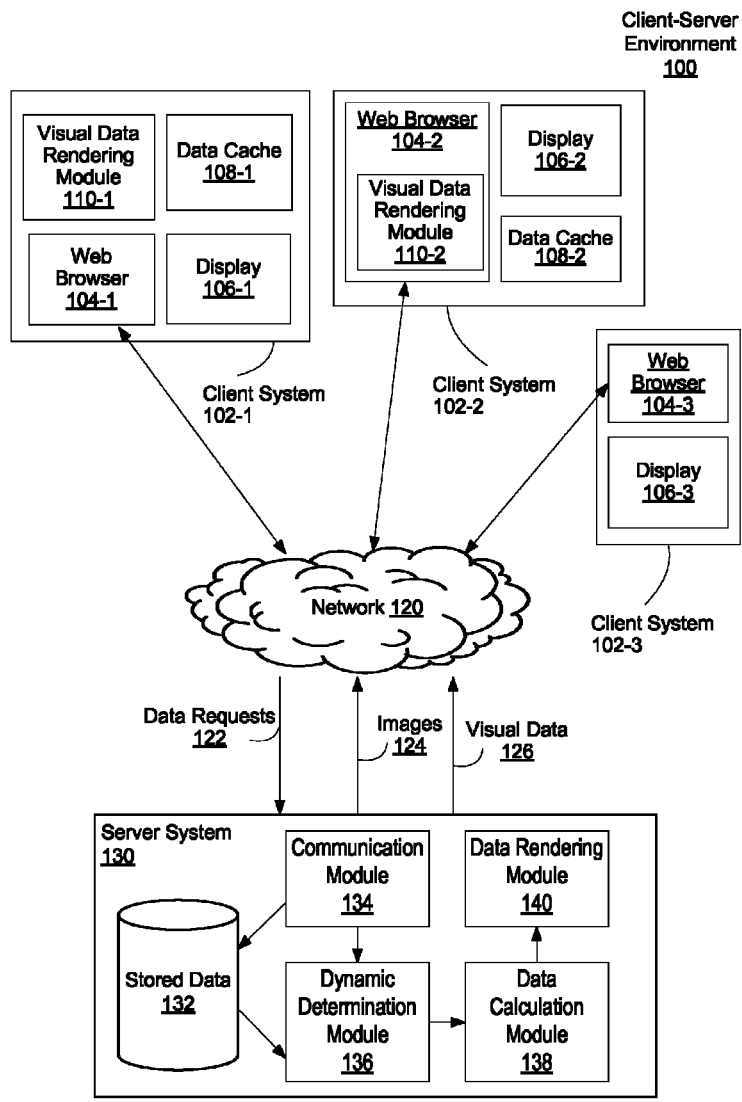
FIG. 1 is a block diagram illustrating a client-server environment 100, in accordance with some implementations.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that the terms first, second, and so on may be used herein to distinguish one element from another, and are otherwise not limiting. For example, a first contact could be termed a second contact, and, similarly, a second contact could be termed a first contact, without departing from the scope of the present implementations. The first contact and the second contact are both contacts, but they are not the same contact.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

DESCRIPTION OF IMPLEMENTATIONS

To more efficiently provide visual representations of complex data services over a network, some implementations dynamically determine where to perform the calculations and rendering for those visual representations. By dynamically determining where to render data, the server provides a more engaging and responsive user experience. When the data set is small, doing work locally removes the latency of round-trips to the server.

Additionally, dynamically allocating work allows the server system to scale to very large data sets, rendering the visual representation at the server when it is impractical to transfer all the raw data over a network to a client. Furthermore, dynamic allocation of rendering tasks allows the visualization server to serve client devices with low bandwidth connections, old or out of date browsers, or limited processing power. Also, by dynamically allocating rendering tasks, the server system eliminates the need for browser plugins.

In accordance with some implementations, a server system stores data. The server system is connected to a network and configured to receive requests from client systems. In some implementations the server receives requests that specify the data requested, specify the particular visualization desired (e.g., how the data will be presented visually), and specify the capabilities, configuration, and/or processing characteristics of the client system. In response to receiving a request, the server system determines the most efficient way to prepare the requested visual representation (also known as a "data visualization") for display at the client system.

In accordance with some implementations, the server determines the most efficient place to do the computing work involved in preparing the requested data visualization. The server determines the location based on several different factors associated with the client device. In some implementations, the factors include the capabilities of the software application the client device will use to present the data visualization. In some implementations, the factors include the bandwidth and latency of the communication channel between the server and the client device. In some implementations the factors include the memory and processing power of the client device, the current load on the client device (e.g., memory and processor utilization), and/or availability of data in the client cache. In some implementations, the factors include the client browser type and browser version number.

In some implementations, in addition to determining the capabilities of the requesting client device, the server system determines the characteristics of the data set and the type of operation or visualization requested. For example, the server determines the size of the data set. It is time-consuming and potentially expensive to send a very large data set the client device to be rendered. However, it may be feasible to transmit a relatively small data set or aggregated data. Furthermore, the server also determines the requested type of operation. For example, the client system can request filtering, sorting, drilling-down, tooltip generation, and aggregation of data.

In some implementations, the server allocates work for generating visual representations based on processing characteristics of the client device (e.g., browser or processor), the transmission characteristics of the communication channel between the client device and the server (e.g., bandwidth), and characteristics of the requested data visualization (e.g., the size of the original and intermediate data sets). The server determines an efficient way to create the requested visual representation by allocating specific tasks to either the server or the client device. For example, suppose a client requests a visualization of 60 million airline flights. The data will be filtered and aggregated so the visualization contains 200,000 distinct aggregated data points to visualize as displayed marks. The client device is a desktop computer with a high-speed processor, lots of memory, and the latest Chrome browser. Despite the capabilities of the browser and the device, the server renders the images and performs the computations because of the size of the result data. The client device then filters the visualization to only 1,000 aggregated data points while interacting with the data visualization. The server now chooses to perform rendering and some computation within the client browser because the data set is much smaller. Some operations continue to require server computation as they require access to all 60 million rows of the original data set.

In some implementations, the client system detects user input indicating a request for a new visual representation of a given data set. Based on the detected user input, the client system sends a request to the server system. The request details the requested data set, the type of visual representation requested, and at least some information that details the capabilities of the client system. For example, suppose the client system detects user input indicating the user desires a visual representation of election results by county. A user is displaying a visualization of senate election results by county (e.g., about 3000 data points), filtered for a particular election year. Filtering senate election results by a particular election year (e.g., 1986) reduces the number of data points by one third, which is approximately 1000 data points. The requested visual representation is a county map of the United States, where the counties are color coded by political affiliation. Counties without data are left blank. In addition to the requested data set, the client system notifies the server system that the client system is using the latest Chrome browser to display the visual representation and that the browser is configured to render visual representations.

In accordance with some implementations, in response to the received request the server system determines an efficient way to prepare the requested visual representations. The determination is based on the size and type of the requested data set, the type of the requested visual representation, and the capabilities of the client system. When the server system is an efficient location to render the visual representations, the requested visual representations are rendered into image files and the image files are transmitted to the client system for display. When the client system is an efficient place to render the visual representations, the server system transmits the requested data set to the client system for rendering and display.

In some implementations, the server system determines that an efficient way to produce visual representations of data is to perform some tasks at the server system and some tasks at the client system. For example, the server system performs the calculations associated with preparing the data to be displayed visually. Once the calculations have been performed, the server system sends the resulting display data to the client system. The display data includes all data necessary to fully render the requested visualization. For example, a user requests a visualization of the average life span of people by the city where they live. The lifespan averages are represented by circles displayed on a map, where the size of the circle indicates the amount above or below the national average for each particular city. A city with a life expectancy above the national average could be represented by a blue circle with an area proportional to the number of years above the national average life span. Alternatively, a city with an average life span below the national average could be represented by a red circle with an area proportional to the number of years below the national average life span. If the server determines that the computational work needs to be split between the server and client systems, the server could produce visual data by calculating the size, location, and color of the circles. The server system then transmits this visual data to the client system and the client system renders the actual image based on the visual data.

In some implementations a client system is currently displaying a visual representation of a set of data. The client system then detects user interaction with the displayed visual representation. Based on the detected user interaction, the client system determines whether the displayed visual representation needs to be changed from the current visual representation to a second visual representation. If a second visual representation is required, the client system determines whether the data needed to present the second visual representation is stored in a data cache at the client system. When the data cache includes the data needed to present the second visual representation, the client system renders the second visual representations using the cached data and displays the visual representation without contacting the server system first. In some implementations, once the second visualization has been displayed, the client system sends an update to the server to notify the server of the changes to the displayed visualization. The server system then transmits updated data to be stored in the data cache at the client system.

In accordance with some implementations, the client system determines that the data cache at the client system does not include all the data needed to display the second visual representation. The client system then sends a request to the server system for the data necessary to create the second visual representation. In some implementations, the server system periodically reassesses the allocation of tasks between the server system and the client system.

In some implementations, when a user loads an interactive visualization in a browser, a request is sent to the server system that includes the "name" of the requested visualization and a summary of the client capabilities. The sent request also includes information such as what permissions the user has when interacting with the visualization (e.g., whether the user has "author" privileges).

In some implementations, the server system stores the initial state of the visualization, including metrics about the overall data size, the number of visual marks in the visualization, and the types of operations supported by the visualization. In some implementations, the server system performs some tests to determine bandwidth and latency metrics between client and server. In some implementations, bandwidth and latency metrics are included in each request or computed from the communication between the client and server.

In some implementations, based on the known metrics, the system determines where rendering and interaction should be performed based on the current state of the visualization. In some implementations, the appropriate code and state information is sent to the client system. Data may be sent to the client as "data" to be rendered and computed locally or sent as image files and metadata. Code sent to the client may be dynamically generated or it may be based on presentation models. In some implementations, the code is sent once as a complete "computation engine" that utilizes state information at the client. The visual representation is then generated and presented to the user in a browser.

In some implementations, as the user interacts with the client system, the server system responds to requests to perform computations. For each interaction, the server system uses the known metrics to determine if the initial response to the interaction should be performed at the client or at the server. If the computation is performed locally at the client, the information is sent to the server to ensure the stored server state remains consistent with the local information at the client. This transmission does not block a response to the user's interaction.

In some implementations, as part of performing the computations, the server system recomputes metrics to determine if the allocation of work should change. For example, changing a filter might result in many more visual marks to display than the last state of the visualization and might result in moving the work from the client to the server.

FIG. 1 is a block diagram illustrating a client-server environment 100, in accordance with some implementations. The client-server environment 100 includes one or more client systems 102, a server system 130, and a network 120. In some implementations, a client system 102-1 includes a web browser application 104-1, a display 106-1, a data cache 108-1, and a visual data rendering module 110-1. In some implementations, the client system 102-1 is an all-in-one desktop computer system, a laptop or tablet computer, a smart phone, or a handheld gaming system. In some implementations, the display 106-1 is any device associated with the client system 102-1 capable of displaying visual information, including a computer monitor, a projector, a display integrated into a smart phone or a tablet, or any other display device. The network 120 may be any of a variety of networks, including local area networks (LAN), wide area networks (WAN), wireless networks, wired networks, the Internet, or a combination of such networks.

In some implementations, the data cache 108-1 includes data retrieved from the server system 130 and stored for later use. In some implementations the data cache 108-1 includes pre-rendered images, calculated visual data, and/or raw data received from the server system 130. In some implementations, the server system 130 transmits data to be cached in the data cache 108-1 based on data that the server anticipates the client system 102-1 will need in the near future. When the client system 102-1 determines a need for an updated displayed visual representation, the client system 102-1 first determines whether the data or image necessary to update the displayed visual representation is stored in the data cache 108-1. In accordance with a determination that the necessary data is available in the data cache 108-1 the client system 102-1 renders the necessary updated visual representation. Otherwise, the client system 102-1 requests the necessary information (data or images) from the server system 130.

In some implementations, the visual data rendering module 110-1 is a software module distinct from the web-browser 104-1. The visual data rendering module 110-1 receives data from the server system 130 when the server system determines, based on the capabilities of the server system 130, the properties of the data sets, and the requested type of visualization, that the client device can efficiently render the images. In some implementations, the server system 130 transmits visual data 126 to the client system 102-1, where the visual data includes pre-calculated information needed to render the requested visual representation. In other implementations, the server system transmits the entire set of raw data to the visual data rendering module 110-1, and the client system performs the calculations and renders the images.

In some implementations, a client system 102-2 includes a web-browser 104-2, a display 106-2, and data cache 108-2. In some implementations the web-browser 104-2 includes a visual data rendering module 110-2. When the web browser 104-2 includes a visual data rendering module 110-2, the web browser does not need a plug-in or stand alone application to render visual representations of data. For example, some versions of Internet Explorer, Chrome, Firefox, and other modern browsers implement the HTML 5 standard and thus are able to render visual representations of data.

In some implementations, a client system 102-3 includes a web-browser 104-3 and a display 106-3. The web-browser 104-3 does not include the ability to render visual data at the client system 102-3. The client system 103-2 is then only able to receive pre-rendered images 124 from the server system 130. The client system 102-3 does not render images or perform any calculations to prepare data for being visually displayed.

In some implementations, a web browser 104 sends data requests 122 from a client system 102 to the server system 130. The data request 122 specifies the data requested, specifies the type of visual representation requested, and specifies the capabilities, configuration, and/or processing characteristics of the client system 102.

In some implementations, the sever system 130 includes a database 132, a communication module 134, a dynamic determination module 136, a data calculation module 138, and a data rendering module 140. The database 132 includes data contained in the server system 130. In some implementations, the data stored in the database 132 is added by the administrators of the server system 130. In other implementations users are able to add or modify data stored in the database 132.

In some implementations, the server system 130 includes a communication module 134. The communication module 134 receives communications from one or more client systems 102 over the network 120. Specifically, the communication module 134 receives data requests 122 from client systems 102. The data requests 122 includes a request to display a visual representation of a specific data set, the specific type of visual representation requested, and capabilities of the client system 102. The communication module 134 requests the appropriate data set from the database 132. For example, a data request 122 may request airline flight records. The database 132 gathers the appropriate data and transfers it to dynamic determination module 136. The communication module 134 further passes the type of visual representation and the capabilities of the client system to the dynamic determination module 136.

In some implementations, the dynamic determination module determines, between the requesting client system and the server system, which system is more efficient at producing the visual representation of the requested data. In some implementations, the dynamic determination module 136 utilizes several variables. The variables include, but are not limited to, the capabilities of the browser, the capabilities and processing power of the computer or device, the bandwidth/latency of the communication channel the size of the original data set and intermediate data sets, and the type of operation requested (filtering, sorting, drill-down, tooltip, aggregation, etc.).

In some implementations the dynamic determination module 136 uses the information concerning the capabilities of the client system 102, the qualities of the data set, and the type of visual data representation requested. The dynamic determination module 136 determines where to perform the tasks for preparing the visual representation of the data set. For example, the server system 130 may choose to perform all rendering at the client system when the aggregated data contains only 1000 distinct visual marks, which can easily be handled at the client system. Some filtering is performed at the client system 102 locally within the browser because it can be computed from a small subset of the overall data. Some filtering or sorting may be performed at the server system 130 when they require access to a much larger set of raw data.

In some implementations, the dynamic determination module 136 assigns specific tasks to the server system 130 and client system 102 based on the analysis of the client system capabilities as discussed above. In some implementations, the dynamic determination module 136 determines that the client system 102 should not perform any calculations or rendering. In this case, the dynamic determination module 136 sends the requested data to the data calculation module 138 for further processing. In some implementations, the determination module 136 determines that the necessary calculations are performed at the server system 130 but the rendering will be performed at the client system 102. In this case the dynamic determination module 136 sends the requested data to the data calculation module 138 for further processing and then the resulting data is sent to the client system 102 for rendering.

In some implementations the dynamic determination module 136 determines that the client system 102 is able to perform all of the calculations and render the data for display. In this case, the dynamic determination module 136 sends the requested data to the client system 102 for calculation and rendering.

In some implementations the data calculation module 138 receives the requested data set and the requested type visual representation from the dynamic determination module 136. The data calculation module 138 uses raw data to calculate the visual data needed to render an image for the requested type of visual representation. For example, if the user requested the data to be presented in the form of a bar graph, the data calculation module 138 would calculate the dimensions of the graph and the height of the rows. Once the visual data 126 has been calculated is it transmitted to either the data rendering module 140 or the client system 102, depending on where the server system 130 has allocated the work associated with rendering the visual representation.

In some implementations, the data rendering module 140 receives calculated visual data 126 from the data calculation module 138. The data rendering module 140 uses the calculated data 126 to produce a visual image, representing the requested data set in the requested visual presentation style. The generated image 124 is then transmitted to the client system 102 for display.

Figure 2:
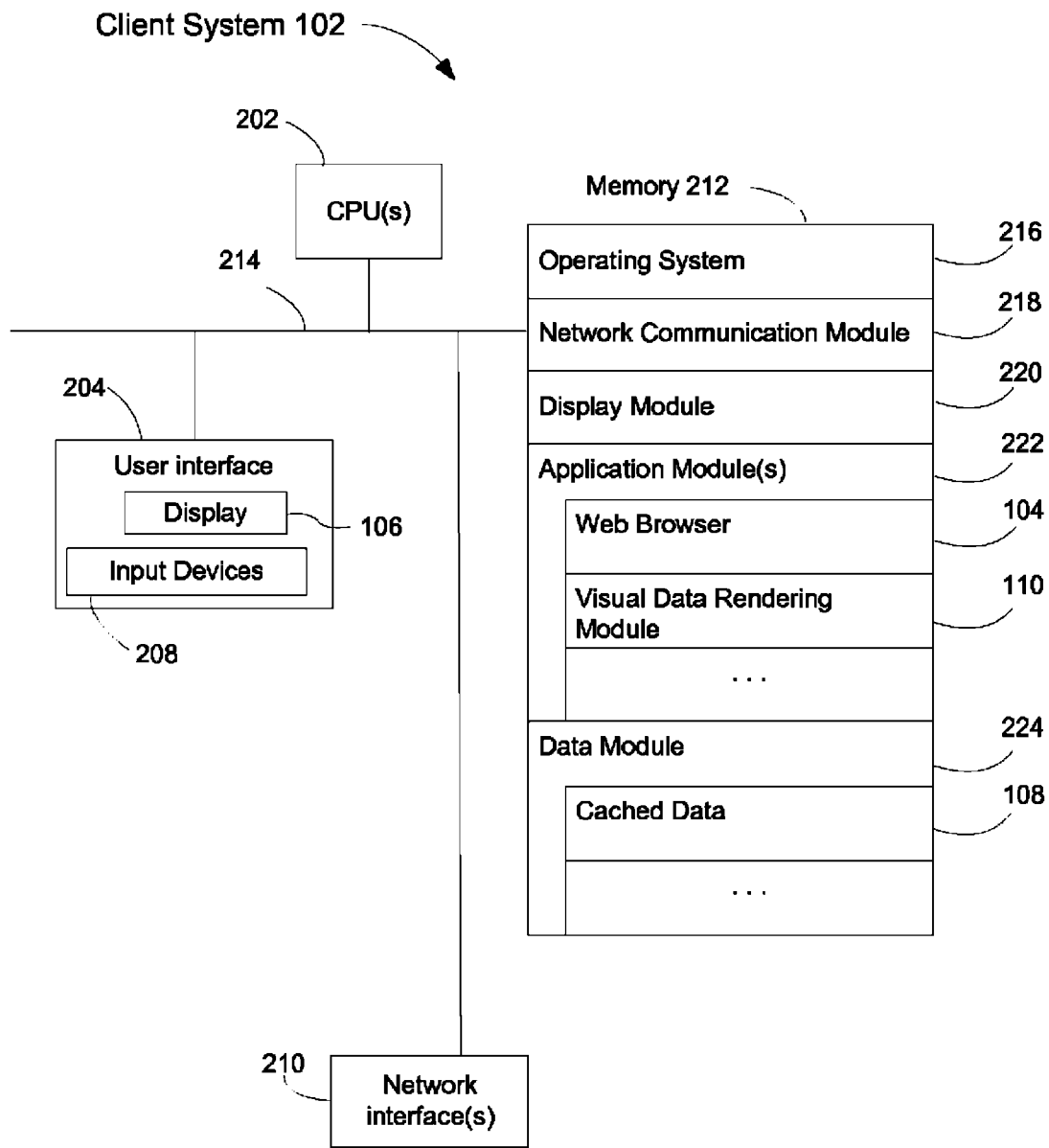
FIG. 2 is a block diagram illustrating a client system 102, in accordance with some implementations.

FIG. 2 is a block diagram illustrating a client system 102, in accordance with some implementations. The client system 102 typically includes one or more processing units (CPU's) 202, one or more network interfaces 210, memory 212, and one or more communication buses 214 for interconnecting these components. The client system 102 includes a user interface 204. The user interface 204 includes an associated display device 106 and optionally includes an input means such as a keyboard, mouse, a touch sensitive display, or other input buttons 208. Optionally, the display device 106 includes an audio device or other information delivery device. Furthermore, some client systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules, and data structures, or a subset thereof:

an operating system 216, which includes procedures for handling various basic system services and for performing hardware dependent tasks;

a network communication module 218, which is used for connecting the client system 102 to other computers via the one or more communication network interfaces 210 (wired or wireless) and one or more communication networks, such as the Internet, other wide area networks, local area networks, metropolitan area networks, and so on;

a display module 220 for enabling presentation of media content on a display 106 associated with the client system 202;

one or more software applications module(s) 222, which provide specific functionality for users;

the software applications 222 include a web browser 104 for requesting, receiving, and displaying information over the network;

the software applications 222 include a visual data rendering module 110 for using received visual data to create an image based on the requested visual representation;

a data module 224 for storing data related to the client system 102; and the data module 224 stores cached data 108, including data received from the server system and stored on the client system 102 for future use.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some implementations, memory 212 may store a subset of the modules and data structures identified above. Furthermore, memory 212 may store additional modules or data structures not described above.

Although FIG. 2 shows a client device 102, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
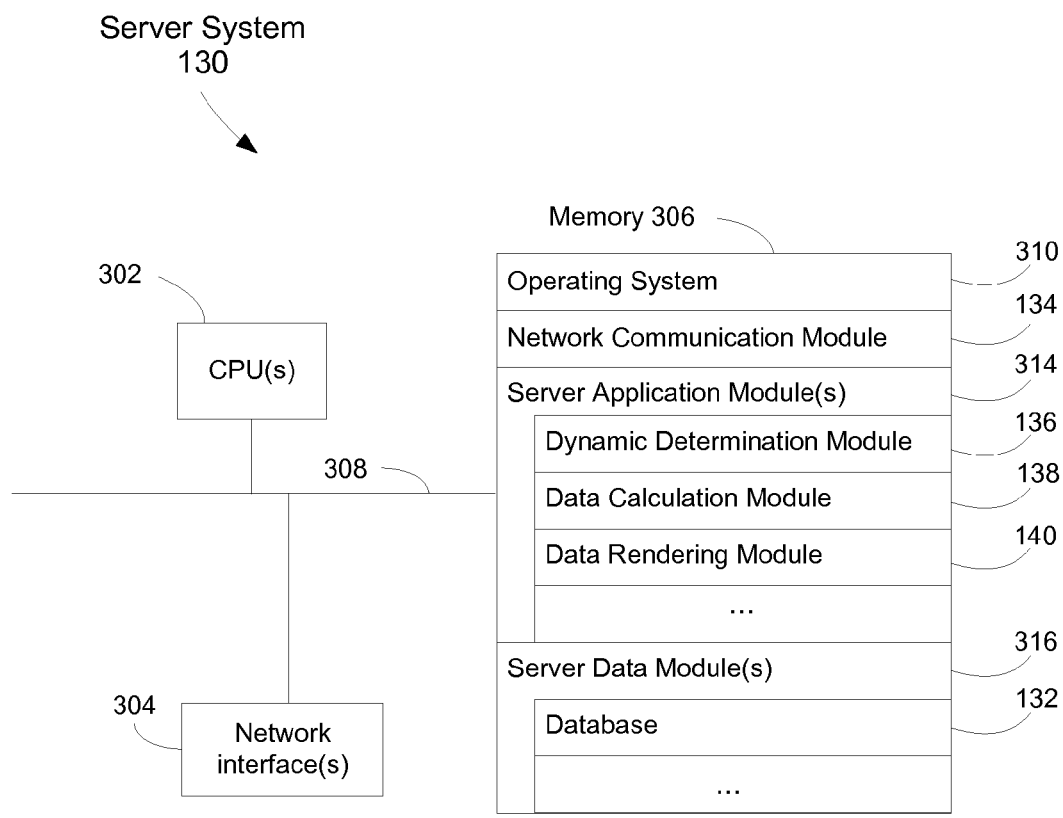
FIG. 3 is a block diagram illustrating a server system 130, in accordance with some implementations.

FIG. 3 is a block diagram illustrating a server system 130, in accordance with some implementations. The server system 130 typically includes one or more processing units (CPU's) 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

an operating system 310 that includes procedures for handling various basic system services and for performing hardware dependent tasks;

a network communication module 134 that is used for connecting the server system 130 to other computers via the one or more communication network interfaces 308

(wired or wireless) and one or more communication networks, such as the Internet, other wide area networks, local area networks, metropolitan area networks, and so on;

one or more server application module(s) 314 for enabling the server system 130 to perform the functions offered by the server system 130, including but not limited to:
  a dynamic determination module 136 for dynamically determining whether to perform calculations necessary to prepare visual representations of data then create rendered images on the client system (FIG. 1, 102) or the server system 130 based on the capabilities and resources of the client system;
  a data calculation module 138 for calculating the data necessary to create a visual representation of the requested data in the requested representation style;
  a data rendering module 140 r for using the calculated data 126 to produce a visual image, representing the requested data set in the requested visual presentation style; and one or more server data module(s) 316 for storing data related to the server system 130, including but not limited to:
  stored data database 132 including all the raw data stored at the server system that users may request to view in a visual representation.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules or data structures not described above.

Although FIG. 3 shows a server system 130, FIG. 3 is intended more as functional description of the various features that may be present rather than as a structural schematic of the embodiments described herein. In practice, and as recognized by those of ordinary skill in the art, items shown separately could be combined and some items could be separated.

Figure 4A:
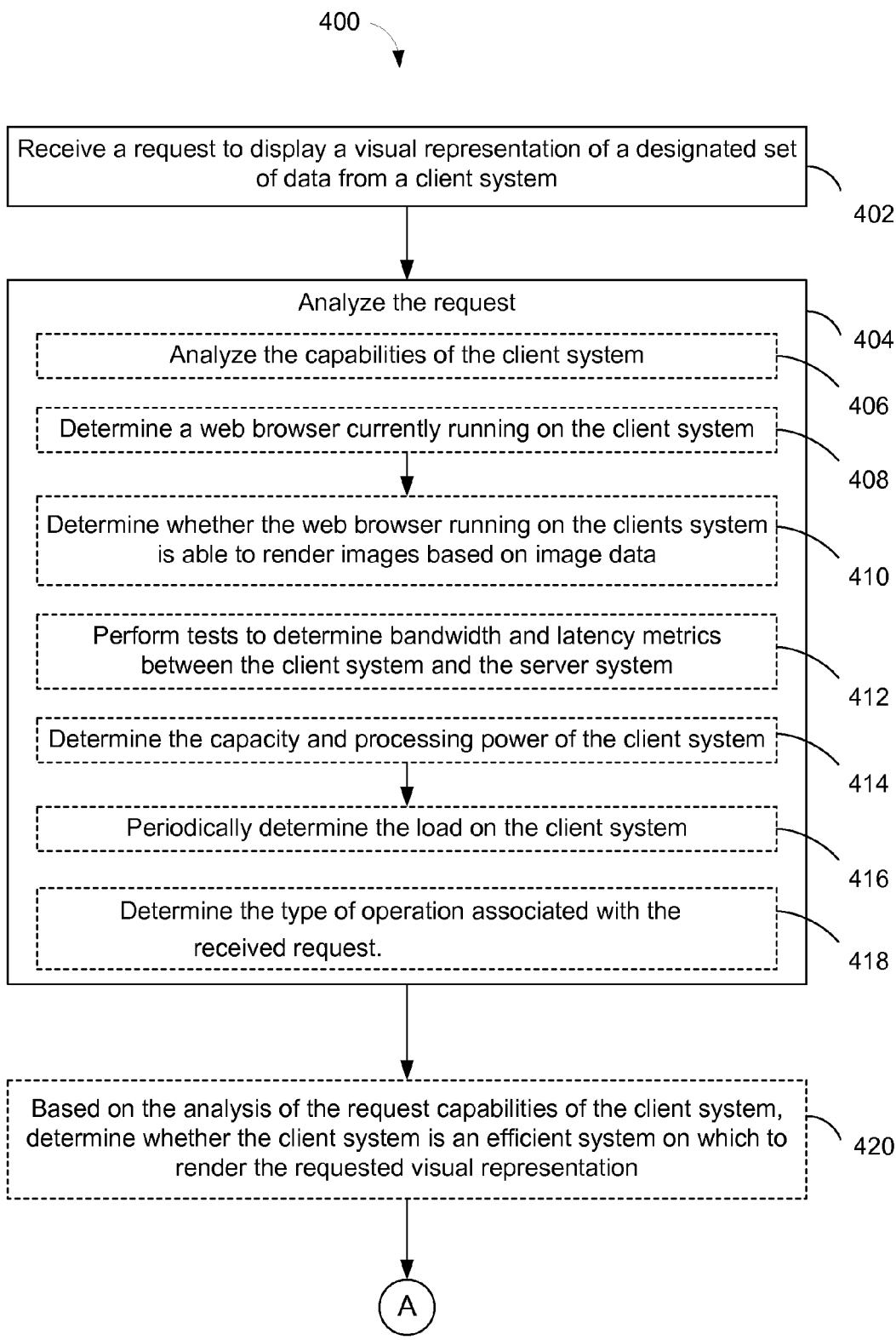
FIGS. 4A and 4B provide a flow diagram illustrating a process of dynamically determining where to render visual representations of requested data in accordance with some implementations.
Figure 4B:
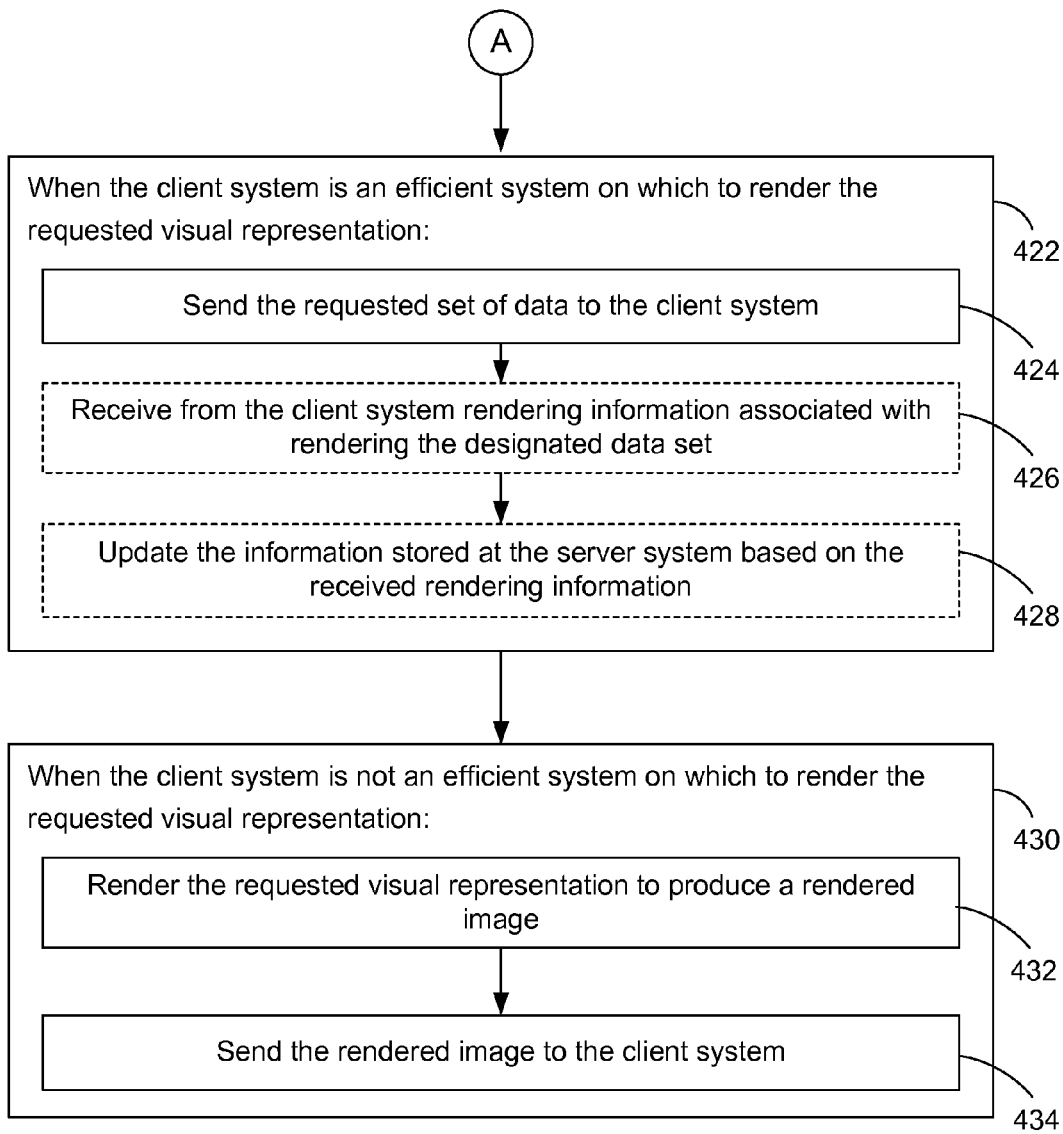

FIGS. 4A and 4B provide a flow diagram illustrating a process 400 of dynamically determining where to render visual representations of requested data in accordance with some implementations. Each of the operations shown in the process 400 may correspond to instructions stored in a computer memory or computer readable storage medium. Optional operations are indicated by boxes with dashed-line borders. In some implementations, the process 400 is performed by a server system 130.

In accordance with some implementations, the server system 130 receives (402) a request to display a visual representation of a designated set of data from a client system 102. The received request includes information describing the capabilities and processing characteristics of the client system. The server system 130 analyzes (404) the request. In some implementations, the server system 130 analyzes (406) the capabilities of the client system. In some implementations, the server system analyzes (406) the capabilities by determining (414) the capacity (e.g., memory) and processing power of client system. The greater the processing power of the client system the more able the client system is to render image data into images. In some implementations, the server system periodically determines (416) the load on the client system (e.g., memory or CPU utilization). In this way the server system 130 can adjust the work distribution as the load on the client system increases or decreases.

In accordance with some implementations, the server system determines (408) the web browser currently running on the client system (including the browser version number). Based on the web browser currently running on the client system, the server system 130 determines (410) whether the web browser is able to render images based on the image data. For example, modern web browsers generally can render images, whereas older browsers cannot. In some implementations the client system includes a plugin or stand alone program that allows the client system 102 to render visual data into images even if the browser does not natively have the ability.

In some implementations the server system 130 determines (418) the type of operation associated with the received request. In some implementations, the server system 130 performs (412) tests to determine bandwidth and latency metrics between the client system and the server system.

The server system 130 then determines (420) whether the client system is an efficient system on which to render the requested visual representation. For example, the server system 130 uses one or more of the factors identified above to determine whether to render images at the client system 102 or at the server system 130.

When the client system is (422) an efficient computer system on which to render the requested visual representation, the server system 130 sends (424) the requested set of data to the client system 102 for rendering and display. In some implementations, the server system receives (426), from the client system, rendering information associated with rendering the designated data set. In this case, the server system 130 updates (428) the information stored at the server system based on the received rendering information.

When the client system is not (430) an efficient computer system on which to render the requested visual representation, the server system 130 renders (432) the requested visual representation to produce a rendered image. The server system 130 then sends (434) the rendered image to the client system.

Figure 5:
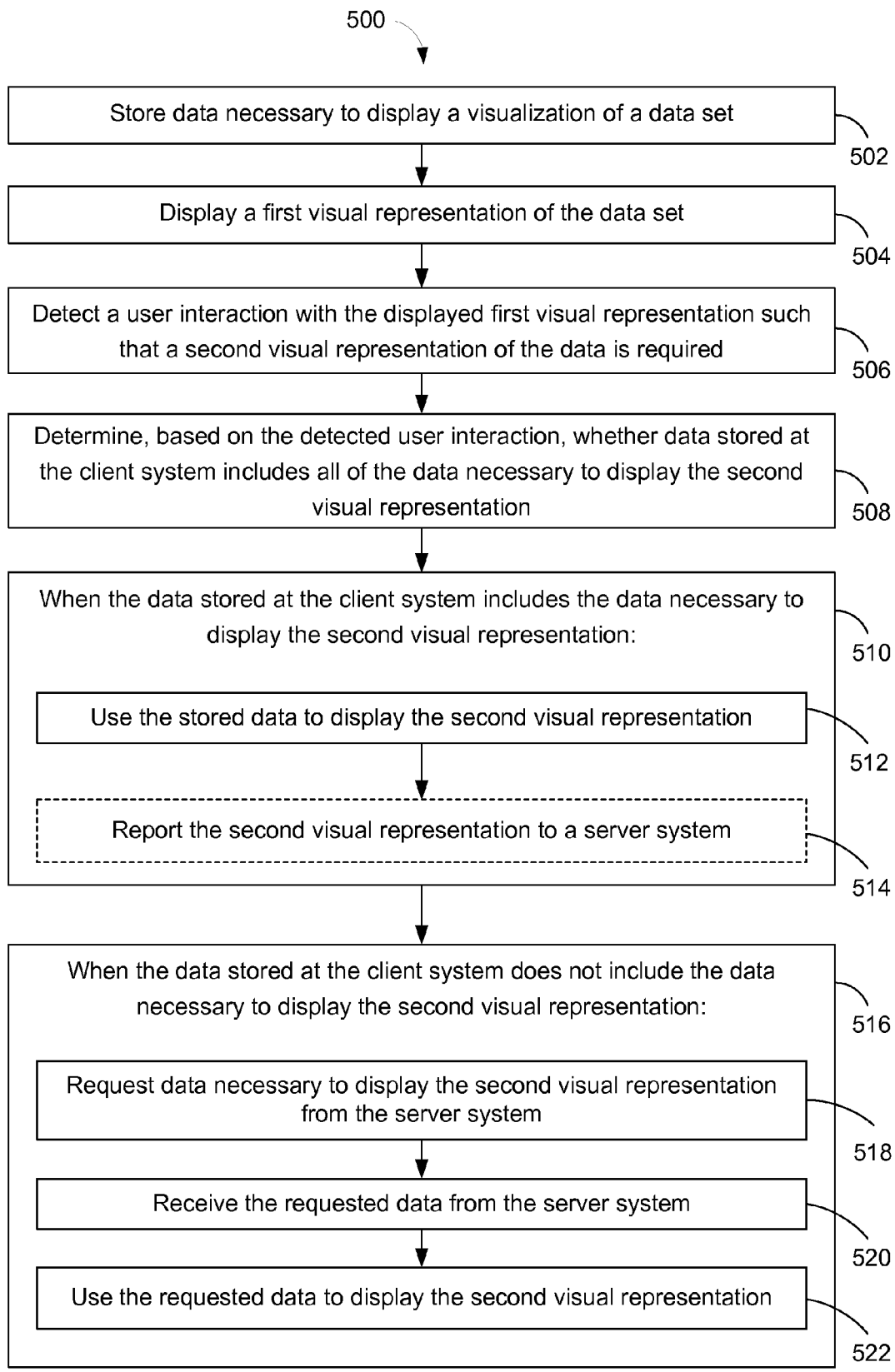
FIG. 5 is a flow diagram illustrating a process of dynamically determining where to render visual representations of requested data in accordance with some implementations.

FIG. 5 provides a flow diagram illustrating a process 500 of dynamically determining where to render visual representations of requested data in accordance with some implementations. A client device 102 stores (502) data necessary to display a visualization of a data set. Typically the data was previously received from a server 130. The client device 102 displays (504) a first visual representation of the data set. For example, the data may be displayed as a bar chart. The client device 102 then detects (506) a user interaction with the displayed first visual representation. The user interaction prompts (506) a second visual representation of the data. For example, the user interaction may request a different type of graphic (e.g., a line graph or a map graphic), a different filter, or a different level of aggregation. The client device 102 then determines (508), based on the detected user interaction, whether data stored at the client system (e.g., in cache) includes all of the data needed to display the second visual representation.

When the data stored at the client device 102 includes (510) the data needed to display the second visual representation, the user device 102 uses (512) the stored data to display the second visual representation. The client device 102 can do this immediately, without contacting the server 130. In some implementations, the client device 102 reports (514) the second visual representation to the server 130 so that the server is aware of what the user is viewing on the client device. This can use be useful, for example, when there is a subsequent request for a third visual representation that requires retrieval of data from the server.

When the data stored at the client system 102 does not include (516) the data necessary to display the second visual representation, the client device 102 requests (518) the necessary data from the server 130. The client device 102 then receives (520) the requested data from the server 130 (either as rows of data or as images). The client device 102 uses (522) the requested data to display the second visual representation. In some implementations, the client device 102 stores the additional data received from the server, which may be used to render subsequently requested visual representations.

Figure 6:
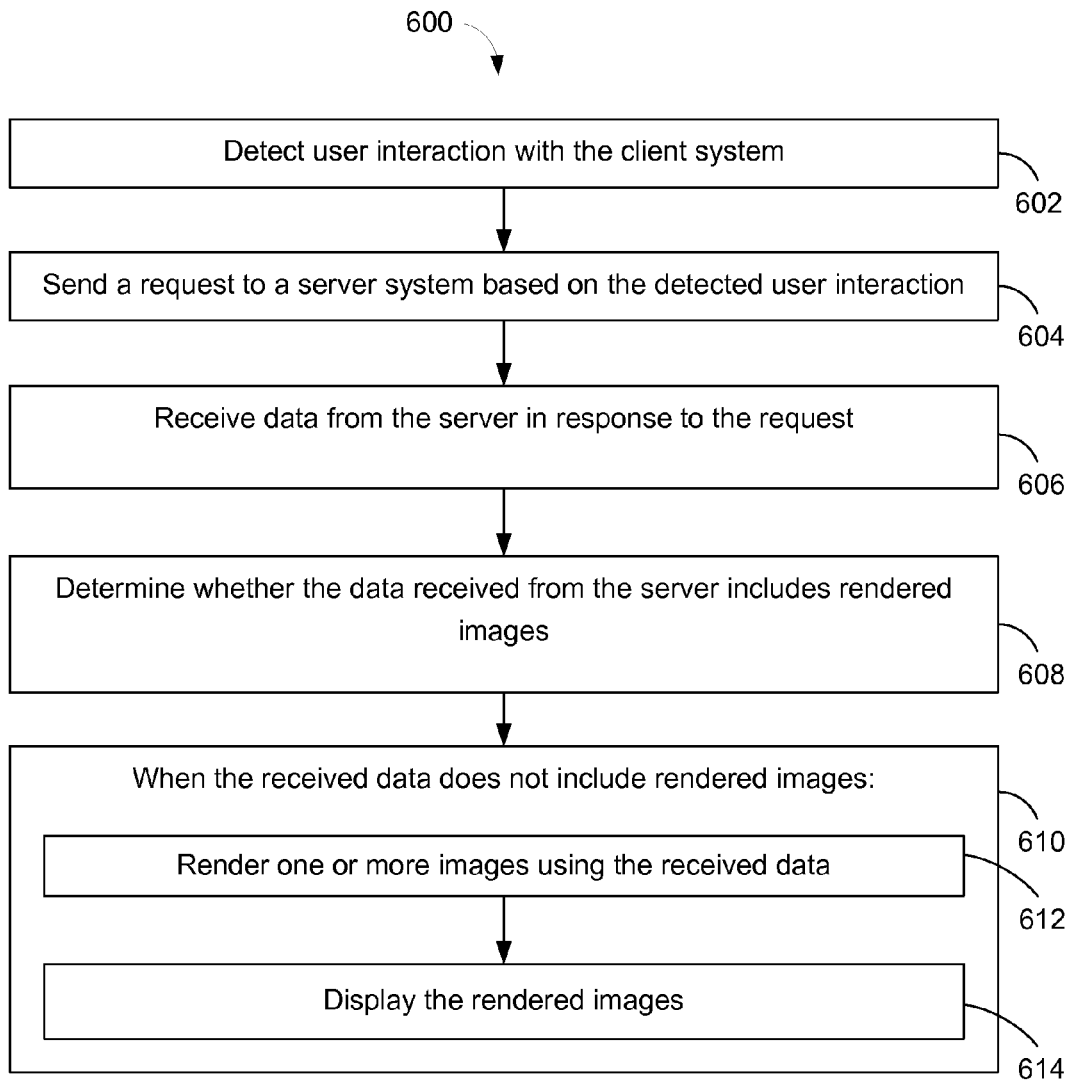
FIG. 6 is a flow diagram for rendering images at a client system in accordance with some implementations.

FIG. 6 provides a flow diagram illustrating a process 600 of dynamically determining what data was provided by a server, and displaying a data visualization accordingly in accordance with some implementations. A client device 102 detects (602) a user interaction with the device 102. The user interaction includes a request to view a visual representation of data. The client device 102 sends (604) a request to a server 130 based on the detected user interaction. As noted above, the request may specify the data requested, specify how the data is to be displayed, and specify information about the client device, including configuration and processing characteristics of the client device 102.

The client device 102 receives (606) data from the server in response to the request. As illustrated above in process 400 in FIGS. 4A and 4B, the data received from the server 130 may include rendered images or raw data. The client device 102 determines (608) whether the data received from the server includes rendered images. When the received data does include one or more rendered images, the client device 102 displays those rendered images. On the other hand, when the received data does not include (610) rendered images, the client device 102 renders (612) one or more images using the received data and displays (614) the rendered images on the client device (e.g., a display device 106).

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for dynamically assigning tasks for visually presenting interactive data, comprising:
    at a server having one or more processors and memory storing one or more programs for execution by the one or more processors:
        receiving a request, from a client device, to display a visual representation of a designated data set in a designated format, wherein the designated data set includes a plurality of rows of data, wherein the designated format specifies an aggregation of the plurality of rows using an aggregation function, and wherein the request further specifies a plurality of client device characteristics selected from the group consisting of:
            memory capacity of the client device;
            current memory utilization of the client device;
            processor capability of the client device;
            current utilization of the processors of the client device; and
            identification of a web browser at the client device that issued the request;
        determining whether to render the requested visual representation at the server or at the client device based on a plurality of factors, including the plurality of client device characteristics, a size of the designated data set, and a size of an intermediate data set resulting from performing the specified aggregation;
        when it is determined to render the requested visual representation at the client device, sending the designated data set to the client device, including data necessary to render the requested visual representation of the designated data set;
        when it is determined to render the requested visual representation at the server:
            rendering the requested visual representation to produce a rendered image, using the designated data set; and
            sending the rendered image to the client device for display.

2. The method of claim 1, wherein rendering the requested visual representation to produce a rendered image includes formatting the designated data set in the designated format.

3. The method of claim 1, further comprising when it is determined to render the requested visual representation at the client device:
    receiving from the client device, after sending the designated data set to the client device, client rendering information associated with rendering the designated data set; and
    updating information stored at the server based on the received client rendering information.

4. The method of claim 1, wherein one of the plurality of device characteristics is identification of the web browser at the client device that issued the request; and
    wherein determining whether to render the requested visual representation at the server or at the client device includes determining whether the identified web browser is able to render images based on image data.

5. The method of claim 1, further comprising performing one or more tests to determine bandwidth between the server and the client device;
    wherein the plurality of factors includes the determined bandwidth.

6. The method of claim 1, further comprising performing one or more tests to determine communication latency between the server and the client device;
    wherein the plurality of factors includes the determined communication latency.

7. The method of claim 1, wherein the plurality of factors includes the designated format for the visual representation.

8. A server system, comprising:
    one or more processing devices;
    a memory device; and
    one or more programs stored in the memory device for execution by the one or more processing devices, the one or more programs comprising instructions for:
        receiving a request, from a client device, to display a visual representation of a designated data set in a designated format, wherein the designated data set includes a plurality of rows of data, wherein the designated format specifies an aggregation of the plurality of rows using an aggregation function, and wherein the request further specifies a plurality of client device characteristics selected from the group consisting of:
memory capacity of the client device;
current memory utilization of the client device;
processor capability of the client device;
current utilization of the processors of the client device; and
identification of a web browser at the client device that issued the request;
determining whether to render the requested visual representation at the server or at the client device based on a plurality of factors, including the plurality of client device characteristics, a size of the designated data set, and a size of an intermediate data set resulting from performing the specified aggregation;
when it is determined to render the requested visual representation at the client device, sending the designated data set to the client device, including data necessary to render the requested visual representation of the designated data set;
when it is determined to render the requested visual representation at the server:
rendering the requested visual representation to produce a rendered image, using the designated data set; and
sending the rendered image to the client device for display.

9. The server system of claim 8, wherein one of the plurality of device characteristics is identification of the web browser at the client device that issued the request; and
wherein the instructions for determining whether to render the requested visual representation at the server or at the client device includes instructions for determining whether the identified web browser is able to render images based on image data.

10. The server system of claim 8, the one or more programs further comprising instructions for performing one or more tests to determine bandwidth between the server and the client device;
wherein the plurality of factors includes the determined bandwidth.

11. The server system of claim 8, the one or more programs further comprising instructions for performing one or more tests to determine communication latency between the server and the client device;
wherein the plurality of factors includes the determined communication latency.

12. The server system of claim 8, wherein the plurality of factors includes the designated format for the visual representation.

13. A non-transitory computer readable storage medium storing one or more programs configured for execution by a server system having one or more processors and memory storing one or more programs for execution by the one or more processors, the one or more programs comprising instructions for:
receiving a request, from a client device, to display a visual representation of a designated data set in a designated format, wherein the designated data set includes a plurality of rows of data, wherein the designated format specifies an aggregation of the plurality of rows using an aggregation function, and wherein the request further specifies a plurality of client device characteristics selected from the group consisting of:
memory capacity of the client device;
current memory utilization of the client device;
processor capability of the client device;
current utilization of the processors of the client device; and
identification of a web browser at the client device that issued the request;
determining whether to render the requested visual representation at the server or at the client device based on a plurality of factors, including the plurality of client device characteristics, a size of the designated data set, and a size of an intermediate data set resulting from performing the specified aggregation;
when it is determined to render the requested visual representation at the client device, sending the designated data set to the client device, including data necessary to render the requested visual representation of the designated data set;
when it is determined to render the requested visual representation at the server:
rendering the requested visual representation to produce a rendered image, using the designated data set; and
sending the rendered image to the client device for display.

* * * * *